May 10, 1955     L. D. GRAMES     2,708,106

CIRCUMFERENTIAL SEALS FOR REGENERATIVE HEAT EXCHANGERS

Filed Sept. 14, 1950

INVENTOR.
Lloyd D. Grames
BY James J. Whisler
ATTORNEY

United States Patent Office 2,708,106
Patented May 10, 1955

2,708,106

CIRCUMFERENTIAL SEALS FOR REGENERATIVE HEAT EXCHANGERS

Lloyd D. Grames, Wellsville, N. Y., assignor to The Air Preheater Corporation, New York, N. Y.

Application September 14, 1950, Serial No. 184,860

3 Claims. (Cl. 257—6)

The present invention relates to rotary regenerative air preheaters or like apparatus and particularly to improved circumferential seals for use between the rotor and its enclosing housing.

In a rotary regenerative heater a cylindrical rotor has compartments that carry heat transfer material which as the rotor turns is first exposed to the heating gases and then disposed in the air passage to impart the absorbed heat to the air. The rotor is surrounded by a housing having end or sector plates formed with openings to provide for the fluid flow and in order to preclude the flow of gas or air through the clearance space between the rotor and housing in a way to by-pass the heat transfer material it is customary to provide circumferential seals between the rotor and the sector plates or other stationary parts.

Figure 1:
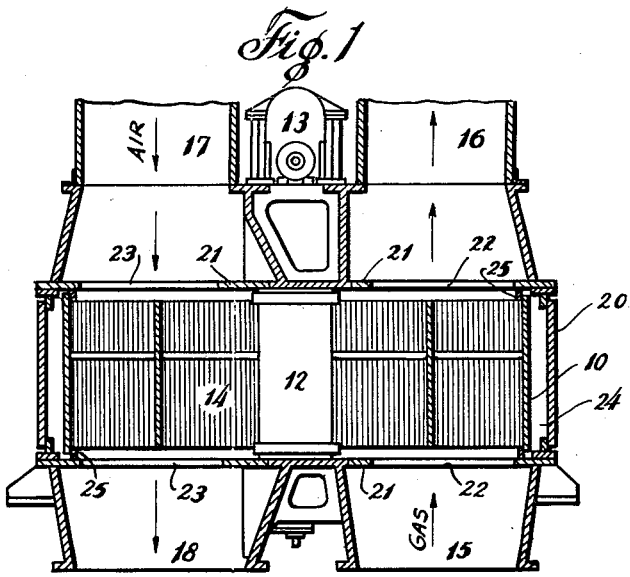
Figure 2:
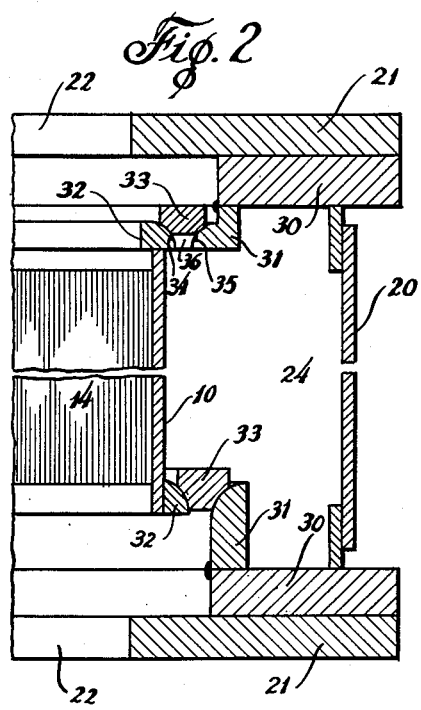
Figure 3:
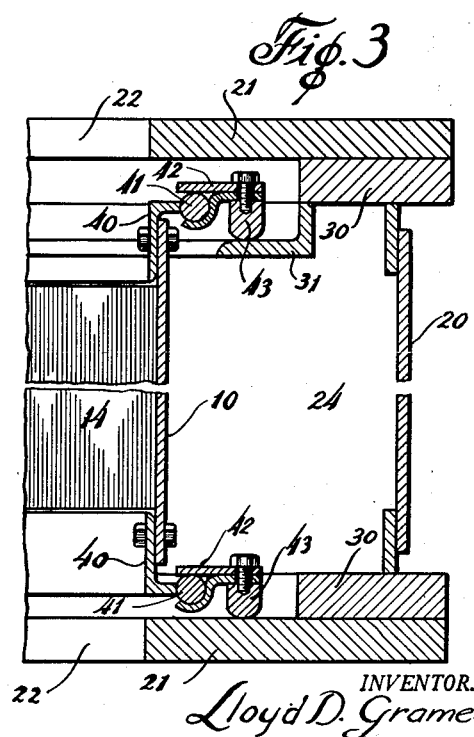

The present invention contemplates improved circumferential sealing devices of novel forms including elements that "float" with respect to the sector plates of the housing, being mounted adjacent the ends of the rotor as will best be understood upon consideration of the following detailed description of several illustrative embodiments of the invention when read in conjunction with the accompanying drawings in which:

Figure 1 is a sectional elevational view in diagrammatic form of a rotary regenerative air preheater embodying the present invention; and Figures 2 and 3 are fragmentary sectional elevational views on an enlarged scale showing the detailed construction of components of two types of the sealing devices.

In the drawings the numeral 10 designates the cylindrical shell of a rotor that is divided into sector shaped compartments by radial partitions connecting it with the rotor post 12 which is driven by a motor and reduction gearing 13 to turn the rotor slowly about its axis. The rotor compartments contain regenerative heat transfer material in the form of metallic plates 14 spaced to provide passages for the flow of gases from which they first absorb heat. The hot gases enter the preheater through a duct 15 from a boiler or other source and are discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through a duct 18. A housing 20 enclosing the rotor 10 is provided at either end opposite the latter with end or sector plates 21 which are apertured at 22 and 23 to permit the streams of gas and air to flow through the rotor of the preheater. In order that the streams of gas and air may not by-pass the heat transfer surface 14 by flowing in the annular clearance space 24 between the rotor shell 10 and the housing 20 it is customary to provide circumferential seals on the shell 10 which wipe against imperforate portions of sector plates 21 or allied parts so as to seal off the space 24 at both ends of the rotor these seals being generally indicated at 25 in Fig. 1.

In accordance with the present invention, the rotor has mounted thereon at or closely adjacent each end edge an annular sealing member 32 extending circumferentially at the rotor at or adjacent each end edge thereof. These are located opposite similar annular sealing members 31 attached to the inner faces of the end plates 21 or preferably to the housing flanges 30 on which the end plates are mounted. The sealing members 31 and 32 are located opposite each other in radially spaced relation and the space between them is bridged by an annular sealing ring 33 which rests freely upon the members 31 and 32 and is held in contact therewith by gravity. All of the annular sealing members 31, 32 and 33 may be divided into a number of abutting arced shaped segments, and the ring 33 is preferably of a soft wearable material. The annular seals 31 and 32 on the rotor and housing are beveled or chamfered at 34 and 35 respectively on the sides facing the space or groove therebetween and the annular ring 33 is suitably shaped to ride easily on these surfaces. With this construction the circumferential seals at the top and bottom of the rotor are fixedly located with respect to each other and the riding members 33 will yieldingly bear against the member 32 which turns with the rotor and the members 31 that are attached to the stationary housing. The rotor thus is free to move in, out, up and down as the result of expansion or contraction, for example, with the rider members 33 being self-adjusting with respect to the movements of the rotating member 32.

In Figure 3 circular angle brackets 40 mounted on the end edges of the rotor shell 10 support the seal bars 41 which as shown are circular and round in cross section. These are engaged between the circumferentially continuous annular sealing strips 42 along one circumferential marginal portion so that the latter are hinged or pivoted on the bars 41. The hinged sealing strips 42 are provided with wear members 43 that bear against the annular sealing rings 31 on the housing or directly against the end plate 21 as shown at the lower part of the exchanger in this figure. The sealing strips 42 have a free up and down hinging movement at the bar 41 and are maintained in sealing contact with the housing surface by gravity. In addition to providing for free in and out movement of the rotor the seals 42 also allow for up and down rotor movement by free hinging on the bars 41, either increasing or decreasing their angle from the horizontal plane in either elevation or declination as required.

What I claim is:

1. In a regenerative heat exchange apparatus having a stationary housing defining a path for a fluid at high temperature and a path for a fluid at a lower temperature, a rotor shell mounted in said housing rotatable about a vertical axis and carrying heat exchange elements into the path of high temperature to absorb heat and subsequently into a stream of air for imparting heat thereto, upper and lower end plates mounted on said housing confronting the rotor and formed with aligned apertures for the flow of said fluids, said end plates provided with annular flanges fixed thereto, groups of upper and lower sealing members comprising a fixed annular sealing member mounted on said flanges, an annular sealing member fixed to said rotor shell and extending circumferentially at each end edge thereof, the upper surfaces of both said members lying in substantially the same plane and spaced apart to form a slot therebetween, an intermediate sealing ring bridging the space between said annular members disposed concentrically thereto, said lower group of sealing members disposed between the outer periphery of said rotor shell and said housing, said upper group of sealing members positioned subjacent to said upper end plates whereby fluids are precluded from flowing between said housing and said rotor shell.

2. The apparatus as defined in claim 1 wherein the surface of said intermediate ring lying in contact with the annular members is bevelled to provide a portion protruding into the slot between the said annular members.

3. The apparatus as defined in claim 2 wherein the intermediate ring is freely capable to float and adjust itself in the aforesaid slot in response to axial and lateral expansion of the rotor due to high heat.

References Cited in the file of this patent

UNITED STATES PATENTS

| | | |
|---|---|---|
| 2,055,071 | Eriksson | Sept. 22, 1936 |
| 2,287,777 | Boestad | June 30, 1942 |
| 2,337,956 | Yerrick | Dec. 28, 1943 |
| 2,347,857 | Waitkus | May 2, 1944 |
| 2,387,301 | Sanford | Oct. 23, 1945 |
| 2,471,995 | Yerrick et al. | May 31, 1949 |
| 2,517,512 | Tigges et al. | Aug. 1, 1950 |
| 2,586,739 | Summers | Feb. 19, 1952 |
| 2,631,870 | Hodson | Mar. 17, 1953 |

FOREIGN PATENTS

| | | |
|---|---|---|
| 268,287 | Switzerland | May 15, 1950 |